(12) United States Patent
Russakovsky et al.

(10) Patent No.: US 7,024,417 B1
(45) Date of Patent: Apr. 4, 2006

(54) DATA MINING FRAMEWORK USING A SIGNATURE ASSOCIATED WITH AN ALGORITHM

(75) Inventors: Alexander Russakovsky, Palo Alto, CA (US); Uri Rodny, Mountain View, CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 472 days.

(21) Appl. No.: 10/295,593

(22) Filed: Nov. 14, 2002

(51) Int. Cl.
*G06F 17/30* (2006.01)

(52) U.S. Cl. .................. 707/101; 707/6; 707/103 R; 717/105; 717/107

(58) Field of Classification Search ............ 707/6, 707/101, 103 R; 717/104–109
See application file for complete search history.

(56) References Cited

U.S. PATENT DOCUMENTS

| | | | | |
|---|---|---|---|---|
| 5,787,425 A | * | 7/1998 | Bigus | 707/6 |
| 5,878,432 A | * | 3/1999 | Misheski et al. | 707/103 R |
| 6,108,004 A | * | 8/2000 | Medl | 715/804 |
| 6,618,852 B1 | * | 9/2003 | van Eikeren et al. | 717/108 |
| 2002/0184610 A1 | * | 12/2002 | Chong et al. | 717/109 |

OTHER PUBLICATIONS

Mitchell et al., A framework for user-interfaces to databases, Proceedings of the workshop on Advanced visual interfaces Gubbio, Italy, pp.: 81-90.*

Fortin et al., "An object-oriented approach to multi-level association rule mining", Proceedings of the fifth international conference on Information and knowledge management, Rockville, Maryland, United States, pp.: 65-72, Year of Publication: 1996.*

* cited by examiner

*Primary Examiner*—Khanh Pham
(74) *Attorney, Agent, or Firm*—Thelen Reid & Priest LLP

(57) ABSTRACT

A framework is provided that enables data mining algorithms to be plugged into it without any change to algorithm software implementations, while still providing all the standard data mining tasks. It may be implemented by the data source provider. It also then allows for the complete separation of data storage and algorithms. When the user initiates a mining session and picks an algorithm for build task or a model for an apply or test task, the framework may become responsible for preparing a set of "prompts" to the user asking him to provide some expression which is specific to the particular kind of data the user is working with.

31 Claims, 4 Drawing Sheets

DATA MINING FRAMEWORK USING A SIGNATURE ASSOCIATED WITH AN ALGORITHM

FIELD OF THE INVENTION

The present invention relates to the field of data mining More specifically, the present invention relates to a universal framework for data mining.

BACKGROUND OF THE INVENTION

Data Mining is a common term for the process of finding useful hidden dependencies or patterns in large amounts of data. The process by which such dependencies or patterns are found is typically called an algorithm. Data Mining activity typically follows a certain workflow having several important stages: data preparation, training (also called building), testing, and application. Data preparation involves preparing the data in a format that can be utilized by an algorithm. Training involves the construction of a concise representation of the algorithm's findings about the data, referred to as the mining model. Testing involves validation of that model. Then, application involves utilizing the model to efficiently produce new previously unknown information, such as projecting the data to predict future events.

FIG. 1 is a diagram illustrating the typical organizational flow of data mining. Data 100 is first prepared 102. This may include cleaning up the formatting of the data so that it is in a form usable by the system. Then a user chooses which data to mine 104. This data is fed to a build model method 106, which builds a model based on the data. A test model method 108, then tests the model and determines whether it can be applied to other data. An application method 110 then may apply the model to other data, after which results may be obtained 112.

Data that needs to be mined may originate from a variety of sources. Each data mining algorithm (which describes how to build, test, and apply the model, among other things) may have different requirements for the data format it takes on input, and produces on output. Mining algorithm vendors have struggled to map various data sources to their input/output requirements. Each mining algorithm vendor may create algorithms that build, test, and apply a certain model. Thus far, it has been all but impossible to use the software implementation of an algorithm with a new data source.

What is needed is a solution that allows data mining algorithms from different vendors to be plugged in without any change to the algorithm software implementation, and also could be used to perform all the standard mining tasks.

BRIEF DESCRIPTION

A framework is provided that enables data mining algorithms to be plugged into it without any change to algorithm software implementations, while still providing all the standard data mining tasks. It may be implemented by the data source provider, however, one of ordinary skill in the art will recognize that the invention should not be limited to implementations where it is implemented by the data source provider. It also then allows for the complete separation of data storage and algorithms. When the user initiates a mining session and picks an algorithm for a build task or a model for an apply or test task, the framework may become responsible for preparing a set of "prompts" to the user asking him to provide some expression which is specific to the particular kind of data the user is working with.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
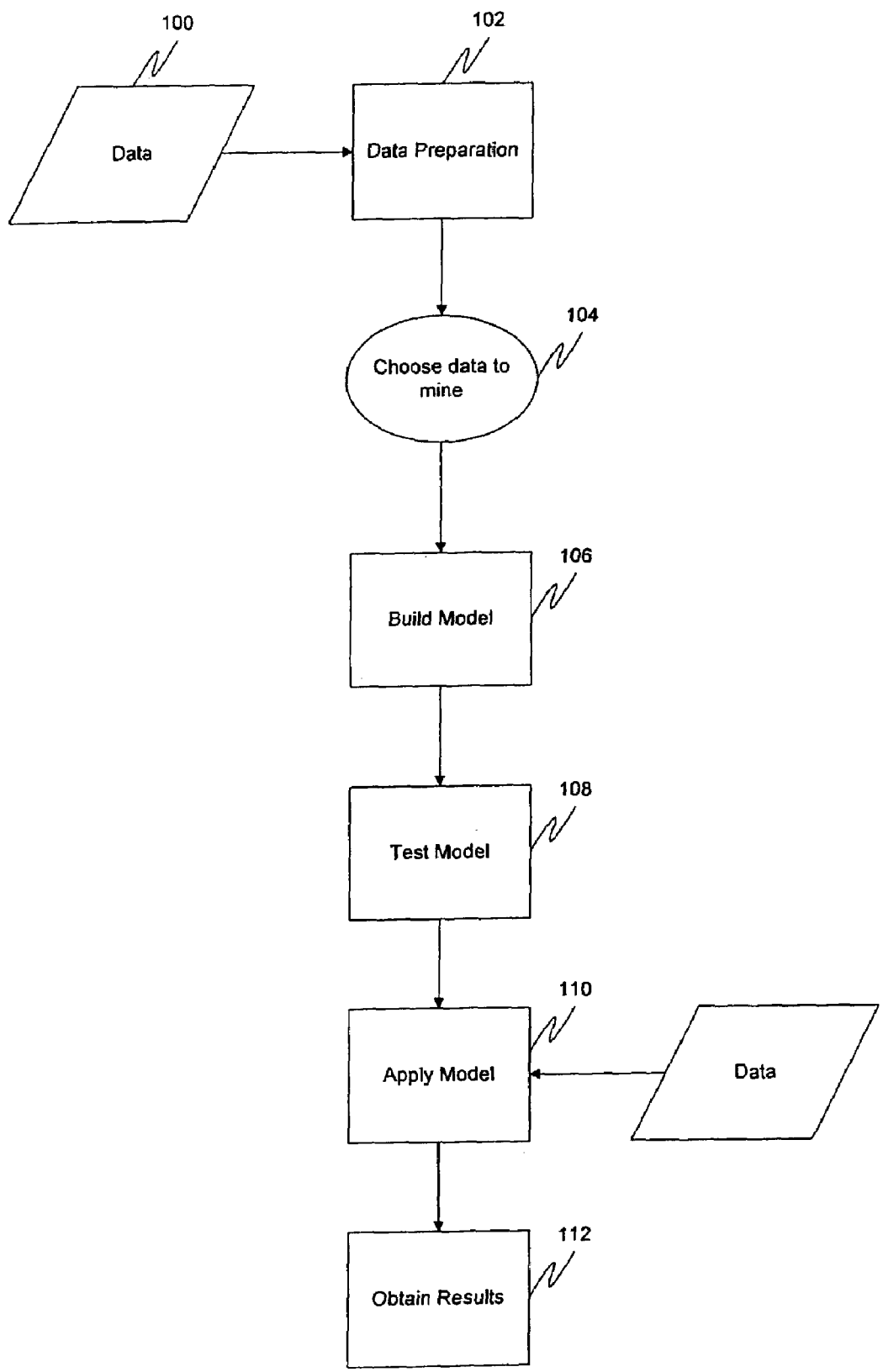
FIG. 1 is a diagram illustrating the typical organizational flow of data mining.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention may be implemented using Extensible Markup Language (XML). However, one of ordinary skill in the art will recognize that there may be other extensible markup languages other than XML, and the term XML in the specification should not be read to be limited to one implementation or version of XML. Additionally, the present invention may be implemented using non-extensible programming languages as well, and an extensible markup language implementation is simply one possibility.

The terms "object", "class", and "interface" will be used throughout this document. An object is a self-contained module of data and its associated processing. An object is an instance of a class, which defines a collection of objects that share the same characteristics. Interface describes the methods of an algorithm, so indicating that the algorithm implementation must follow certain rules is the same as indicating that the algorithm class must implement a certain interface.

Data mining algorithms work with data, which also may be referred to as variables called mining attributes. Each mining attribute plays a certain role, for example, it can represent an independent variable (predictor), a derived variable (target), or a model element. It can also represent a collection of variables and/or elements. Each mining attribute's actual data values can be accessed through its accessor. An accessor is an interface featuring methods (such as getValue) used to get values for different data types. These methods may return the data value at the current position. One attribute may refer to many positions in the data, so it is often necessary to have a cursor that points to the current position and a way to iterate through positions. There may be several directions in which iteration is possible, called axes. A typical example is a table where one can iterate over columns as well as over rows. Several axes, each within its own accessor, may form a domain. This means that iteration over the axes is synchronized: changing a position in one of the axes leads to a simultaneous change in other axes within the domain. Thus, iteration actually takes place on the domain. Hence, a domain is a type of interface with typical iterator methods, such as reset, advance, getSize, getPosition, setPosition, etc.

The present invention provides a framework that enables data mining algorithms to be plugged into it without any change to algorithm software implementations, while still providing all the standard data mining tasks. It may be implemented by the data source provider, however, one of ordinary skill in the art will recognize that the invention should not be limited to implementations where it is implemented by the data source provider. It also then allows for the complete separation of data storage and algorithms.

The framework itself is a generic tool for performing data mining. Data mining operations are performed by mining algorithms that the framework initially does not know about but is able to supply with data according to their signatures. The signature determines which data is required and what its logical structure is but does not make any assumptions as to how this data is physically organized.

When the user initiates a mining session and picks an algorithm for a build task or a model for an apply or test task, the framework becomes responsible for preparing a set of "prompts" to the user asking him to provide some expression which is specific to the particular kind of data source that the user is working with. This means that while an algorithm would not change depending on the kind of data source, the framework's data access layer typically needs to be implemented for each particular kind of data source.

A specific embodiment of the present invention is a particular variation of the data mining framework described herein that implements data access layer to mutidimensional data. As a language for implementation it uses a mixture of C and Java programming languages. The interfaces described in the invention such as DataProvider, DataAccessor, DomainIterator, etc are implemented in Java and expect the algorithms to implement the Algorithm interface in Java as well, although the implementation of the latter interface in Java could be just a wrapper on top of C or C++ code. This implementation of the framework allows the algorithms to access data directly within the server process thereby avoiding movement of large amounts of data across the network. The user may also be provided with the ability to perform data mining related activities via a graphical user interface built according to the principles described in the invention.

This implementation in particular proves the validity of the framework design and the fact that the framework actually works and satisfies the requirements stated in the invention description. Algorithm implementations may cover the main kinds of data mining algorithms such as regression, clustering, neural networks, association rules, decision trees, naive Bayes, etc. Despite very different nature of these algorithms they all work well within the framework.

The algorithm software developer may implement an interface with methods build, test, apply, etc., one for each mining task, as well as methods setParameterValue, for each supported parameter type, and method getSignature. The mining task methods may each take one parameter of the type DataProvider, which is another interface whose only purpose is to let the algorithm obtain the objects implementing the accessor and domain interfaces by name for each accessor and domain involved in the task. The task methods may return success statuses (true or false?). The setParameterValue methods may each take two arguments, one being the name of the parameter and the other being of one of several supported types (e.g., double, integer, boolean, text string, etc.). The purpose of these methods is to let the framework communicate to the algorithm the values of parameters which may be required for the particular task invocation. A getSignature method of the algorithm may take no arguments and return the signature object.

A signature is used to describe parameters required by tasks in an algorithm. This signature describes not only the number and type of parameters, but also may include an information field, which is utilized to describe some or all of the functionality of each parameter. The functionality will typically include the meaning of the parameter and/or the recommended usage of the parameter. The system may utilize the signature for a particular algorithm to create a template for each task. The template may indicate one or more fields that need to be initialized by the user to invoke the task, as well as information retrieved from the information field. A graphical user interface may then be generated using the template, where the user can initialize the fields by indicating a mapping between the terms of the task and the actual data source. This allows each algorithm the luxury of ignoring the complexity of the data, and simply dealing with the mapping it is passed.

Figure 2:
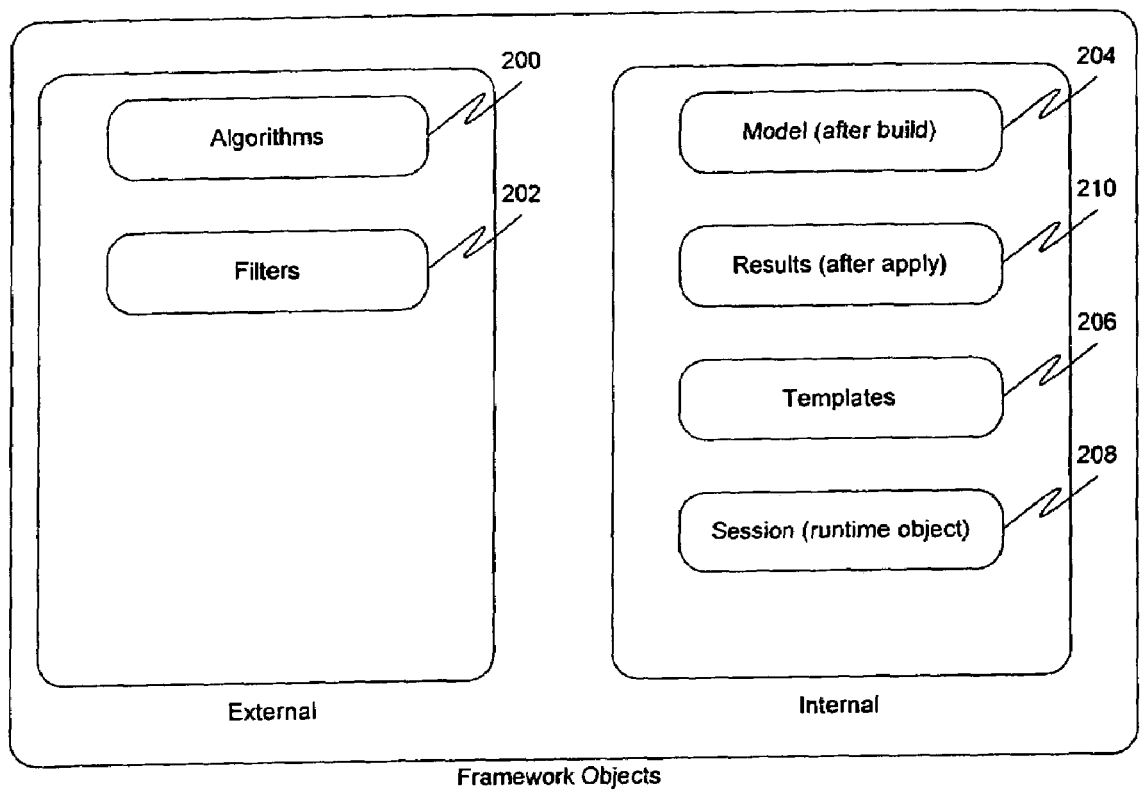
FIG. 2 is a diagram illustrating some of the objects which may be maintained by a framework in accordance with an embodiment of the present invention.

FIG. 2 is a diagram illustrating some of the objects which may be maintained by a framework in accordance with an embodiment of the present invention. Algorithms 200 and filters 202 may be framework objects but may actually be maintained externally. Algorithms have been described earlier in this document, and filters are functions that perform transformations on data. After the build method has been executed, a model object 204 may be maintained by the framework. Once a template is created, a template object 206 may also then be maintained by the framework. At runtime, a session (runtime object) 208 may be maintained.

After the apply method is performed, results 210 may be maintained. Functions available for objects in the framework may include list, add, and remove.

In an embodiment of the present invention, the signature file may be implemented as a text string in an file in accordance with a certain XML format. The XML format may be defined in an XML document type definition (DTD), such as:

```
<!ELEMENT algorithm (information, domain*, attribute*, task+)>
<!ATTLIST algorithm
    function (Regression | Clustering | DecisionTree | NeuralNet |
AssociationRules) #REQUIRED
    vector (false | true) 'false'
>
<!ELEMENT information (#PCDATA)>
<!ELEMENT task (information, parameter*, accessor*)>
<ATTLIST task
    mode (build | test | apply | import | export | score) #REQUIRED
>
<!ELEMENT parameter (information, itemlist*)>
<!ELEMENT itemlist (item+)>
<!ELEMENT item (information*)>
<!ATTLIST item
    value NMTOKEN #REQUIRED
    description CDATA #IMPLIED
>
<!ATTLIST parameter
    name NMTOKEN #REQUIRED
    type (double | integer | string | boolean | enum) 'double'
    value NMTOKEN #REQUIRED
>
<!ELEMENT attribute (information, axis*)>
<!ATTLIST attribute
    name NMTOKEN #REQUIRED
    type (numerical | categorical | ordinal | boolean) 'numerical'
    parameter NMTOKEN #IMPLIED
    role (predictor | target | model) #IMPLIED
>
<!ELEMENT domain (information*)>
<!ATTLIST domain
    name NMTOKEN #REQUIRED
    type (regular | attribute | sequence | modelData | internal) 'regular'
    size NMTOKEN #IMPLIED
>
<!ELEMENT accessor (information*)>
<!ATTLIST accessor
    attribute NMTOKEN #REQUIRED
    mode (read | write) #IMPLLED
>
<!ELEMENT axis (information*)>
<!ATTLIST axis
    domain NMTOKEN #REQUIRED
>
```

Figure 3:
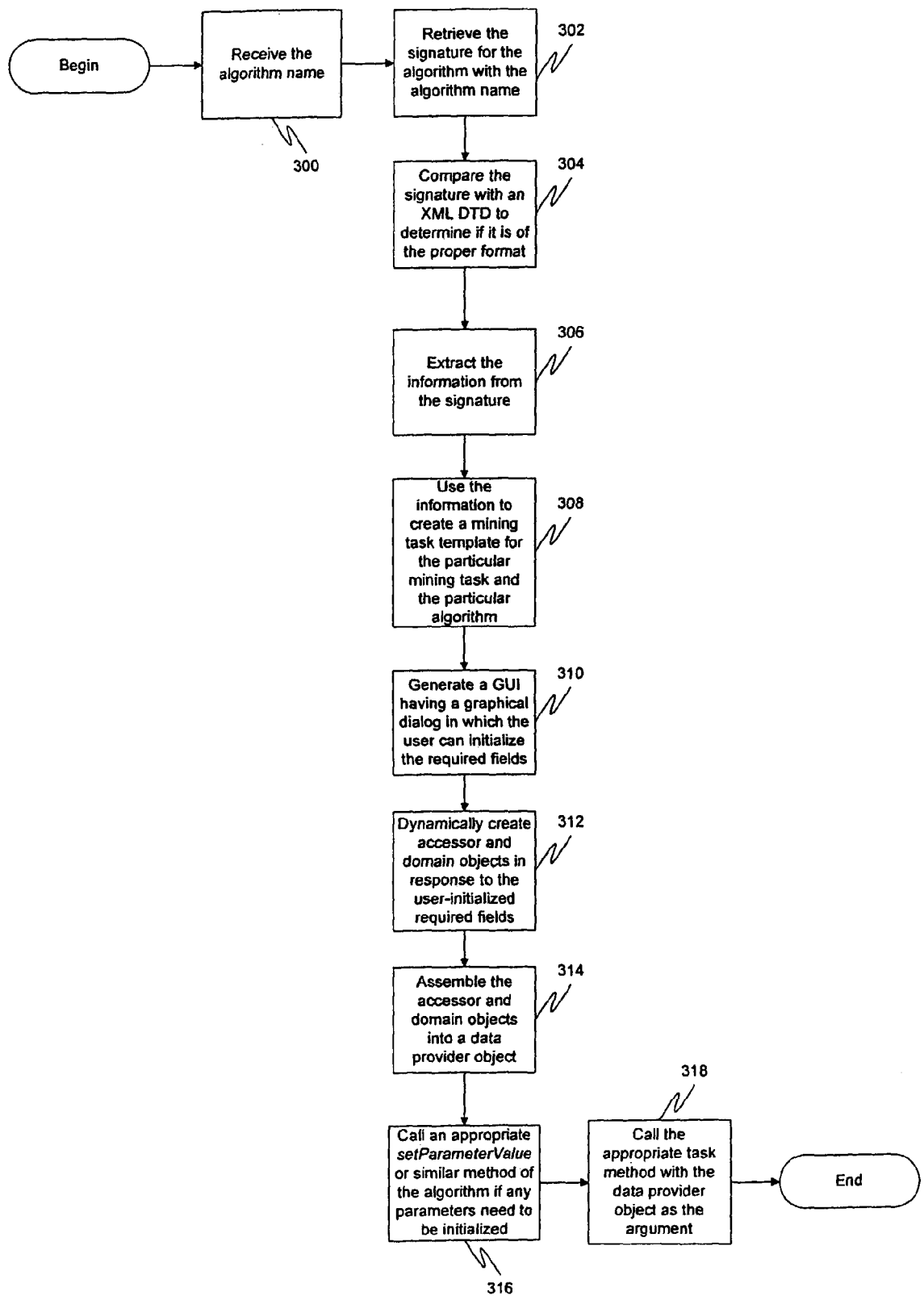
FIG. 3 is a flow diagram illustrating a method for data mining using an algorithm, the algorithm having one or more tasks, each task having a number of parameters, each parameter having a type, in accordance with an embodiment of the present invention.

FIG. 3 is a flow diagram illustrating a method for data mining using an algorithm, the algorithm having one or more tasks, each task having a number of parameters, each parameter having a type, in accordance with an embodiment of the present invention. The algorithm has been assigned some unique name under which it becomes known to the users. A signature has also been created for the algorithm by the algorithm developer. To invoke a particular mining task, the user first chooses a (previously built) model to apply. Then, from the model, the framework determines which algorithm should be used to apply it, specifying the algorithm name. Thus, at 300, the framework receives the algorithm name. At 302, the signature for the algorithm with that algorithm name is retrieved. At 304, this signature may be compared with an XML DTD to determine if it is of the proper format. If not, then the algorithm is not supported by the framework and the data mining task cannot proceed. If it is supported, however, at 306 the framework extracts the information from the signature (what parameters and accessors are required for the task, what structure (domains) those accessors have, what role they play, etc.). At 308, the framework uses this information to create a mining task template for the particular mining task and the particular algorithm. The template is a specification of all the fields that need to be initialized by the user to invoke the task, together with the information about their recommended usage. At 310, the framework may generate a graphical user interface (GUI) having a graphical dialog in which the user can initialize the required fields. This may include prompting the user to provide a mapping from terms of the algorithm to an actual data source. At 312, the framework may dynamically create accessor and domain objects in response to the user-initialized required fields. Then, at 314, the framework may assemble the accessor and domain objects into a data provider object. At 316, the framework may call an appropriate setParameterValue or similar method of the algorithm if any parameters need to be initialized. Then at 318, the framework may call the appropriate task method with the data provider object as the argument. This completes the mining task.

Figure 4:
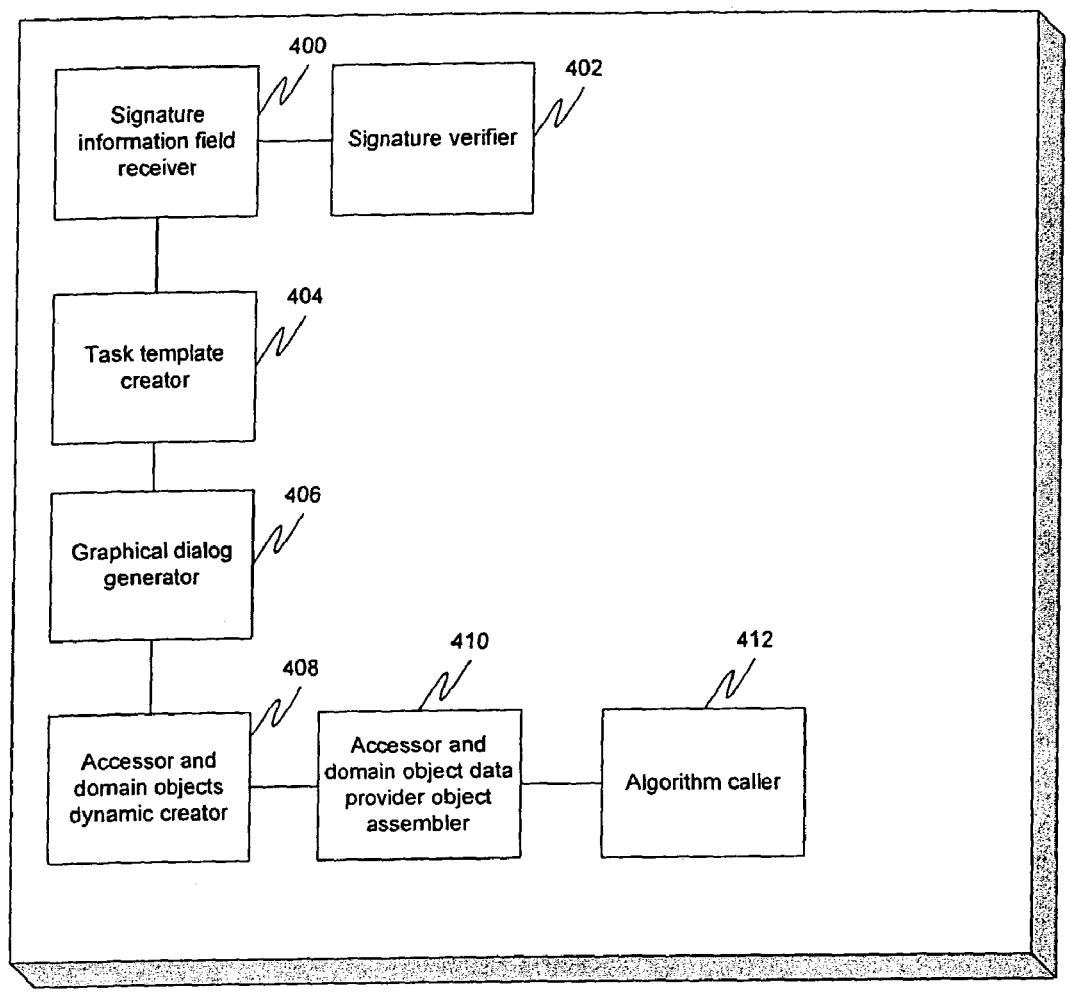
FIG. 4 is a block diagram an apparatus for data mining using an algorithm, the algorithm having one or more tasks, each task having a number of parameters, each parameter having a type, in accordance with an embodiment of the present invention.

FIG. 4 is a block diagram an apparatus for data mining using an algorithm, the algorithm having one or more tasks, each task having a number of parameters, each parameter having a type, in accordance with an embodiment of the present invention. The algorithm has been assigned some unique name under which it becomes known to the users. A signature has also been created for the algorithm by the algorithm developer. To invoke a particular mining task, the user first chooses a (previously built) model to apply. Then, from the model, the framework determines which algorithm should be used to apply it, specifying the algorithm name. A signature information field receiver 400 may retrieve the signature for the algorithm with that algorithm name. A signature verifier 402 coupled to the signature information field receiver 400 may compare the signature with an XML DTD to determine if it is of the proper format. If not, then the algorithm is not supported by the framework and the data mining task cannot proceed. If it is supported, however, the framework extracts the information from the signature (what parameters and accessors are required for the task, what structure (domains) those accessors have, what role they play, etc.). A task template creator 404 coupled to the signature information field receiver 400 may use this information to create a mining task template for the particular mining task and the particular algorithm. The template is a specification of all the fields that need to be initialized by the user to invoke the task, together with the information about their recommended usage. A graphical dialog generator 406 coupled to the task template creator 404 may generate a graphical user interface (GUI) having a graphical dialog in which the user can initialize the required fields. This may include prompting the user to provide a mapping from terms of the algorithm to an actual data source. An accessor and domain objects dynamic creator 408 coupled to the graphical dialog generator 406 may dynamically create accessor and domain objects in response to the user-initialized required fields. Then, an accessor and domain object data provider object assembler 410 coupled to the access and domain objects dynamic creator 408 may assemble the accessor and domain objects into a data provider object. The framework may call an appropriate setParameterValue or similar method of the algorithm if any parameters need to be initialized. Then an algorithm caller 412 coupled to the accessor and domain object data provider object assembler 410 may call the appropriate task method of the algorithm with the data provider object as the argument. This completes the mining task.

As described above, the framework prompts the user for a mapping from the terms of the algorithm to the actual data store. This mapping is transparent for the algorithm, but the framework uses it to construct the accessor and domain objects. The way that the mapping is created depends on the data access mechanism for the data store. For example, when dealing with relational sources, a Structured Query Language (SQL) mapping may be used, but for multidimensional databases, some multidimensional query language mapping may be used. In either case, the user provides some source specific linguistic expression or source specific "query object" for each axis in each accessor.

Mining objects such as models and result sets are usually stored in at the site of the original data source. Therefore, it is the algorithm's responsibility to make sure that they are persisted. Since their structure is described in the algorithm signature, the framework has all the necessary information to build the corresponding accessors with "write access" mode, so the algorithm can use those accessors to save the objects. The framework may capture the expressions entered by the user (or constructed internally) so that the mining objects can be located and retrieved at any time.

The major mining tasks (build, test, and apply) have been described above. Each algorithm typically must support at least these three tasks. However, there may be other tasks that make sense within the framework, for instance exporting mining models to and importing mining models from Predictive Model Markup Language (PMML). The former takes a model object built by a particular algorithm and represents it in PMML format whereas the latter takes a model in PMML format and creates a model object that can be used for application purposes within the framework. These "exchange" tasks should also be described in the algorithm signature if the algorithm supports them. More tasks can be easily added to the framework workflow as it evolves.

Since the framework captures all the information regarding the location of a mining object in the data store (called object metadata), and each such object is uniquely named, it is possible for the user to query the objects through the framework. The framework uses the object metadata and the regular means available in the particular data store (such as SQL, or multidimensional query language) to retrieve the object data. This way although the object's signature may be specific to the algorithm used, it can be queried and retrieved in standard format without the algorithm. This provides great flexibility to the client tools because they do not have to worry about how to access mining objects.

An example is hereby provided to help illustrate some of the terms utilized in this document. One of ordinary skill in the art will recognize that this is merely an example, and is not intended to be limiting in any way. Suppose the algorithm is a linear regression algorithm. Linear regression attempts to determine the equation of a line that best represents a series of data points. The equation of the line may be described using two coefficients, slope and intercept. This line may then be used to predict future data points. If the initial training data points are represented as $(x_i, y_i)_{i=1}^{N}$, and $x_i$ is a predictor and $y_i$ is a target, the algorithm uses their values to produce appropriate coefficients. These coefficients comprise a model of the training dataset.

Thus, to predict a value in the future, a value for $x_i$ may be plugged in, resulting in a predicted value for $y_i$ derived using a formula involving the coefficients.

The knowledge, which data must be provided on input and which coefficients would be produced for the model, lies exclusively with the algorithm (and not with the framework). Its signature file may then contain information regarding various accessors, including predictor, target, slope, and intercept. For the build task, that aims at deriving the model coefficients, accessor predictor may have two parameters, indicated in the signature file as domain 1 and domain 2. This, therefore, indicates that predictor has two parameters, and that they are different from each other. The graphic dialog may prompt for the mapping of these two parameters, which the user may respond with as "time" (for domain 1), which indicates where to take the data from, and "I=1 . . . N" or "from January 2001 to September 2002" (for domain 2), which indicates how to navigate through time data. Accessor target may also have two parameters, indicated in the signature file as domain 3 and domain 2. This indicates that the second parameter for target is the navigated simultaneously with the second parameter for predictor. The mapping of domain 3 may be to "sales", whereas the mapping for domain 2 may remain "I=1 . . . N". Additionally, accessors for slope write, and for intercept may be provided, each having a single parameter. The names of the accessors (e.g., predictor, target) may also indicate the role of the accessor. The described information is sufficient to perform the build task. The signature for the apply task may contain information regarding similar accessors, except that this time, slope and intercept as well as predictor may indicate read access and target may indicate write access. Or, the apply task may be contain some other accessors describing the output of the algorithm, for instance, expected precision of the line fit, various statistics about the algorithm execution, model characteristics, etc.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for data mining using an algorithm, the algorithm having a build task, a test task, and an apply task, each task having a number of parameters, each parameter having a type, the method comprising:

retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm; and creating a template for said the build task based on said signature, said template indicating one or more of said parameters that need to be initialized by a user to invoke said task and one or more model values that are to be derived from a data set; and executing said template to create a mapping between said one or more coefficients and said one or more model values.

2. The method of claim 1, further comprising:
verifying said signature.

3. The method of claim 2, wherein said verifying comprises:

comparing said signature to a predefined standard format for said signature; and rejecting said signature if said signature does not match said predefined standard format.

4. The method of claim 3, wherein said predefined standard format is a document type definition.

5. The method of claim 1, further comprising:

generating a graphical dialog based on said template, said graphical dialog allowing a user to initialize required parameters.

6. The method of claim 5, further comprising:

dynamically creating accessor and domain objects in response to user-initialized required parameters; and assembling said accessor and domain objects into a data provider object.

7. The method of claim 6, further comprising calling the algorithm using said data provider object as an argument.

8. The method of claim 6, wherein said graphical dialog prompts a user to provide a mapping from terms of the algorithm to an actual data source.

9. The method of claim 8, wherein said terms of the algorithm include accessors and domains.

10. The method of claim 9, wherein said graphical dialog further prompts a user to provide a source specific linguistic expression for each axis in each accessor.

11. The method of claim 10, wherein said source specific linguistic expression is a source specific query object.

12. A method for data mining using an algorithm, the algorithm having a build task, a test task, and an apply task, each task having a number of parameters, each parameter having a type, the method comprising:

retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm;

creating a template for the build task based on said signature, said template indicating one or more of said parameters that need to be initialized by a user to invoke said task and one or more model values that are to be derived from a data set; and executing said template to create a mapping between said one or more coefficients and said one or more model values, said execution generating a set of prompts asking said user to provide some expression specific to a data source said user is working with.

13. An apparatus for data mining using an algorithm, the algorithm having, a build task, a test task, and an apply task, each task having a number of parameters, each parameter having a type, the apparatus comprising:

a signature information field receiver configured to retrieve a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm;

a task template creator coupled to said signature information field receiver, wherein the task template creator is configured to create a template for the build task based on said signature, said template indicating one or more of said parameters that need to be initialized by a user to invoke said task and one or more model values that are to be derived from a data set; and an executing module coupled to the task template creator, wherein the execution module is configured to execute said template to create a mapping between said one or more coefficients and said one or more model values.

14. The apparatus of claim 13, further comprising a signature verifier coupled to said signature information field receiver.

15. The apparatus of claim 13, further comprising a graphical dialog generator coupled to said task template creator.

16. The apparatus of claim 15, further comprising:

an accessor and domain objects dynamic creator coupled to said graphic dialog generator; and an accessor and domain object data provider object assembler coupled to said accessor and domain objects dynamic creator.

17. The apparatus of claim 16, further comprising an algorithm caller coupled to said accessor and domain object data provider object assembler.

18. An apparatus for data mining using an algorithm, the algorithm having a build task, a test task, and an apply task, each task having a number of parameters, each parameter having a type, the apparatus comprising:

means for retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm;

means for creating a template for the build task based on said signature, said template indicating one or more of said parameters that need to be initialized by a user to invoke said task and one or more model values that are to be derived from a data set; and means for executing said template to create a mapping between said one or more coefficients and said one or more model values.

19. The apparatus of claim 18, further comprising:

means for verifying said signature.

20. The apparatus of claim 19, wherein said verifying comprises:

means for comparing said signature to a predefined standard format for said signature; and means for rejecting said signature if said signature does not match said predefined standard format.

21. The apparatus of claim 20, wherein said predefined standard format is a document type definition.

22. The apparatus of claim 18, further comprising:

means for generating a graphical dialog based on said template, said graphical dialog allowing a user to initialize required parameters.

23. The apparatus of claim 22, further comprising:

means for dynamically creating accessor and domain objects in response to user-initialized required parameters; and means for assembling said accessor and domain objects into a data provider object.

24. The apparatus of claim 23, further comprising means for calling the algorithm using said data provider object as an argument.

25. The apparatus of claim 24, wherein said graphical dialog prompts a user to provide a mapping from terms of the algorithm to an actual data source.

26. The apparatus of claim 25, wherein said terms of the algorithm include accessors and domains.

27. The apparatus of claim 26, wherein said graphical dialog further prompts a user to provide a source specific linguistic expression for each axis in each accessor.

28. The apparatus of claim 27, wherein said source specific linguistic expression is a source specific query object.

29. An apparatus for data mining using an algorithm, the algorithm having a build task, a test task, and an apply task, each task having a number of parameters, each parameter having a type, the apparatus comprising:

means for retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm;

means for creating a template for the build task based on said signature, said template indicating one or more of said parameters that need to be initialized by a user to invoke said task and one or more model values that are to be derived from a data set; and means for executing said template to create a mapping between said one or more coefficients and said one or more model values, said execution generating a set of prompts asking said user to provide some expression specific to a data source said user is working with.

30. A program storage device readable by a machine, tangibly embodying a program of instructions executable by the machine to perform a method for data mining using an algorithm, the algorithm having a build task, a test task, and an apply task, each task having a number of parameters, each parameter having a type, the method comprising:

retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm; and creating a template for the build task based on said signature, said template indicating one or more of said parameters that need to be initialized by a user to invoke said task and one or more model values that are to be derived from a data set; and executing said template to create a mapping between said one or more coefficients and said one or more model values.

31. A program storage device readable by a machine, tangibly embodying a program of instructions executable by the machine to perform a method for data mining using an algorithm, the algorithm having a build task, a test task, and an apply task, each task having a number of parameters, each parameter having a type, the method comprising:

retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm;

creating a template for the build task based on said signature, said template indicating one or more of said parameters fields that need to be initialized by a user to invoke said task and one or more model values that are to be derived from a data set; and executing said template to create a mapping between said one or more coefficients and said one or more model values, said execution generating a set of prompts asking said user to provide some expression specific to a data source said user is working with.

* * * * *

UNITED STATES PATENT AND TRADEMARK OFFICE
CERTIFICATE OF CORRECTION

PATENT NO. : 7,024,417 B1
APPLICATION NO. : 10/295593
DATED : April 4, 2006
INVENTOR(S) : Russakovsky et al.

It is certified that error appears in the above-identified patent and that said Letters Patent is hereby corrected as shown below:

In column 8 line 54, replace "; and" with --;--.

In column 8 line 56, replace "said the build" with --the build--.

In column 12 line 7, replace "; and" with --;--.

In column 12 line 33, replace "parameters fields" with --parameters--.

Signed and Sealed this

Twenty-fourth Day of July, 2007

JON W. DUDAS
*Director of the United States Patent and Trademark Office*